P. A. WAGNER.
LOOM HARNESS.
APPLICATION FILED MAR. 19, 1912. RENEWED MAR. 4, 1914.
1,112,739.
Patented Oct. 6, 1914.
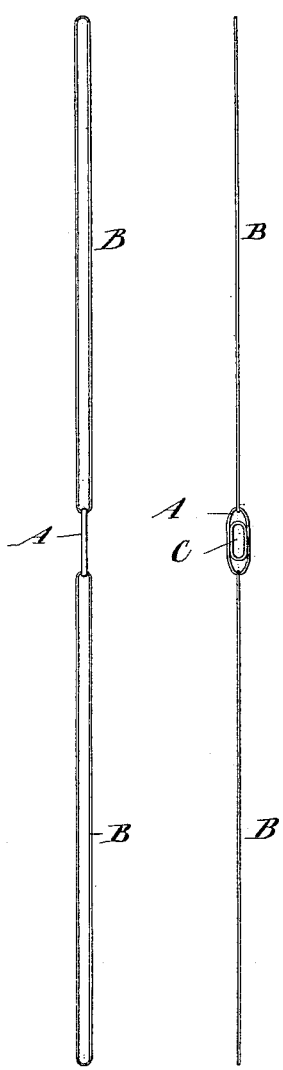
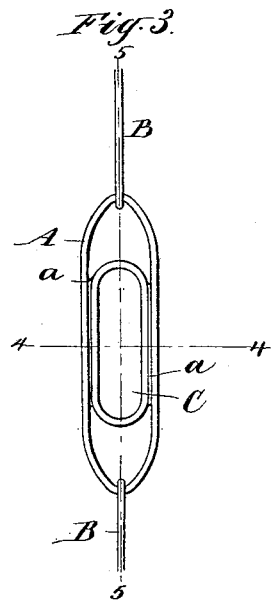
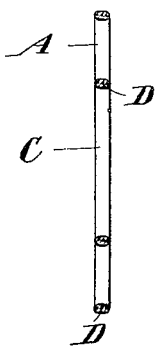
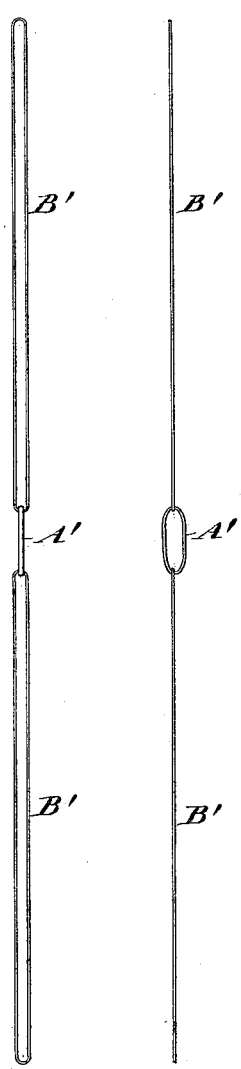

UNITED STATES PATENT OFFICE.

PAUL A. WAGNER, OF CARLSTADT, NEW JERSEY.

LOOM-HARNESS.

1,112,739.   Specification of Letters Patent.   Patented Oct. 6, 1914.

Application filed March 19, 1912, Serial No. 684,855. Renewed March 4, 1914. Serial No. 822,477.

*To all whom it may concern:*

Be it known that I, PAUL A. WAGNER, a citizen of the United States, residing at Carlstadt, in the county of Bergen and State of New Jersey, have invented a certain new and useful Improvement in Loom-Harness, of which the following is a specification.

The invention relates to the construction of the warp-eye, and the object of the invention is to provide an eye adapted to receive the warp-thread and leashes, which shall be light and strong, smoothly surfaced, presenting no salient angles or shoulders, and which may be economically manufactured and incorporated with the harness.

The invention consists in certain novel features of construction by which the above objects are attained, to be hereinafter described.

The accompanying drawings form a part of this specification and show approved forms of the invention.

Figure 1 is an edge view of a preferred form of eye, with its leashes, on a greatly exaggerated scale. Fig. 2 is a corresponding face view. Fig. 3 is a similar face view on a still larger scale. Fig. 4 is a transverse section of the eye alone, taken on the line 4—4 in Fig. 3. Fig. 5 is a corresponding longitudinal section, on the line 5—5 in Fig. 3. Figs. 6 and 7 are views corresponding respectively to Figs. 1 and 2, showing a modified form of the eye.

Similar letters of reference indicate like parts in all the figures.

The eyes are composed of a suitable gum reinforced by a skeleton or foundation of fibrous material, each is in the form of a flattened annulus.

Referring to Figs. 1 to 5 inclusive, showing a preferred form of the invention, the main portion of the eye is marked A and receives in the bight at each end a loop B of harness thread forming the leashes and receiving the laths, not shown.

Within each flattened annulus A is a supplemental eye C of the same material and similarly constructed but smaller, secured to the inner faces of the side members of the eye A by any suitable cement $a$ or by the same gum of which both the eyes are composed.

The gum when freed from its solvent is hard but sufficiently flexible for the purpose, the surfaces of the eye are smooth by reason of the qualities of the gum, and by reason of its shape the eye presents no exterior angles. The warp-thread passes unobstructedly through the eye and is not subjected to roughnesses tending to cut its fibers or in contact with harmful surfaces.

Figs. 6 and 7 show a simple form in which the supplemental eye is omitted and the single flattened annulus $A^1$ receives both the leashes $B^1$ and the warp-thread, not shown.

In both forms the eye may be very small especially for harness intended for silk weaving in which the harness must be as fine as practicable and consequently so constructed as to permit the closely adjacent eyes to pass without interference when elevated and depressed by the movements of the heddles. The improved harness attains these requirements.

Gum lac dissolved in alcohol may be employed as the body of the eye, which is preferably baked after the solvent has evaporated to impart the desired hard surface, but other gums having the desired qualities may be substituted, and the silk filaments D may be replaced by other threads or fibers, as cotton or linen, or absorbent fibrous fabric or other material having the required strength, as Japanese paper containing silk or other fibers, may be employed as the core for the eye.

The gum employed is such as to be weatherproof, and will not soften in warm weather, so there is no danger of sticking to the warps. In some cases it may be vulcanized.

I claim:—

1. In a loom harness, an annulus composed of gum upon and inclosing a core of fiber, and leashes engaged in said annulus.

2. In a loom harness, an annulus composed of gum upon and inclosing a core of fiber, leashes engaged in said annulus, and a smaller annulus similarly composed, received within said first-named annulus and adapted to receive a warp-thread.

3. A heddle eye composed of gum in the form of a flattened annulus, and an inclosed core of fiber serving as a foundation for and to strengthen said annulus.

4. A heddle eye composed of gum in the form of a flattened annulus, and an inclosed core of fiber serving as a foundation for and to strengthen said annulus, and a smaller annulus received within said first-named annulus.

5. A heddle eye composed of gum in the form of a flattened annulus, and an inclosed core of fiber serving as a foundation for and to strengthen said annulus, and a smaller annulus similarly composed, and received within said first-named annulus and lying in the same plane therewith and cemented thereto.

In testimony that I claim the invention above set forth I affix my signature, in presence of two witnesses.

PAUL A. WAGNER.

Witnesses:
CHARLES R. SEARLE,
C. M. FREDERICKS.

Copies of this patent may be obtained for five cents each, by addressing the "Commissioner of Patents, Washington, D. C."